(12) United States Patent
Hu et al.

(10) Patent No.: US 10,745,425 B2
(45) Date of Patent: Aug. 18, 2020

(54) CHEMILUMINESCENCE ENHANCER AND CHEMILUMINESCENCE IMMUNODETECTION KIT

(71) Applicant: SHENZHEN YHLO BIOTECH CO., LTD., Shenzhen (CN)

(72) Inventors: Kunhui Hu, Shenzhen (CN); Gang Wang, Shenzhen (CN); Fuzhen Xia, Shenzhen (CN); Chungen Qian, Shenzhen (CN); Liang Zhu, Shenzhen (CN); Dingbiao Zou, Shenzhen (CN)

(73) Assignee: SHENZHEN YHLO BIOTECH CO., LTD., Shenzhen (CN)

( * ) Notice: Subject to any disclaimer, the term of this patent is extended or adjusted under 35 U.S.C. 154(b) by 0 days.

(21) Appl. No.: 16/314,388

(22) PCT Filed: Jul. 1, 2016

(86) PCT No.: PCT/CN2016/088126
§ 371 (c)(1),
(2) Date: Dec. 29, 2018

(87) PCT Pub. No.: WO2018/000420
PCT Pub. Date: Jan. 4, 2018

(65) Prior Publication Data
US 2019/0153003 A1    May 23, 2019

(51) Int. Cl.
*G01N 21/76* (2006.01)
*C07F 9/09* (2006.01)
(Continued)

(52) U.S. Cl.
CPC .............. *C07F 9/141* (2013.01); *C07F 9/091* (2013.01); *C09K 11/07* (2013.01); *G01N 21/76* (2013.01)

(58) Field of Classification Search
CPC ...................................................... G01N 21/76
(Continued)

(56) References Cited

U.S. PATENT DOCUMENTS

| 5,215,976 A | 6/1993 | Fost et al. |
| 5,658,749 A * | 8/1997 | Thornton ............. C12Q 1/6806 435/29 |

FOREIGN PATENT DOCUMENTS

| CN | 1257904 A | 6/2000 |
| CN | 1301364 A | 6/2001 |

(Continued)

OTHER PUBLICATIONS

Machine-generated English-language translation of CN-102391538-A.*

(Continued)

*Primary Examiner* — Vu A Nguyen
(74) *Attorney, Agent, or Firm* — Kilpatrick Townsend & Stockton, LLP

(57) ABSTRACT

Disclosed a chemiluminescence enhancer and a chemiluminescence immunodetection kit. The chemiluminescence enhancer is specifically a betaine and can be used for enhancing the luminance of a luminescent acridine substance. The chemiluminescence immunodetection kit comprising the chemiluminescence enhancer and a luminescent acridine substance features greatly enhanced luminescence signals and high detection sensibility, and can be widely applied to fields such as clinical diagnoses, scientific research, and sanitation analysis.

5 Claims, 1 Drawing Sheet

(51) Int. Cl.
    *C07F 9/141*     (2006.01)
    *C08K 5/19*     (2006.01)
    *C09K 11/07*     (2006.01)

(58) Field of Classification Search
    USPC .......................................................... 252/700
    See application file for complete search history.

(56) References Cited

FOREIGN PATENT DOCUMENTS

| | | | |
|---|---|---|---|
| CN | 101226200 A | | 7/2008 |
| CN | 101412909 A | | 4/2009 |
| CN | 102391538 A | * | 3/2012 |
| CN | 102391538 A | | 3/2012 |
| CN | 103620409 A | | 3/2014 |
| CN | 104891570 A | | 9/2015 |
| CN | 105623637 A | | 6/2016 |
| JP | S5851187 A | | 3/1983 |

OTHER PUBLICATIONS

SciFinder Search (Dec. 21, 2019).*
SciFinder Search (May 6, 2020).*
STN Search (May 7, 2020).*

* cited by examiner

CHEMILUMINESCENCE ENHANCER AND CHEMILUMINESCENCE IMMUNODETECTION KIT

CROSS-REFERENCE TO RELATED APPLICATIONS

This application is a U.S. National Stage of International Application No. PCT/CN2016/088126, filed on Jul. 1, 2016, which is hereby incorporated by reference in its entirety.

FIELD

The present disclosure relates to the field of analytical detection technology, and more particularly relates to a chemiluminescence enhancer and a chemiluminescence immunoassay kit.

BACKGROUND

Chemiluminescence immunoassay (CLIA) is a novel labeling immunoassay technique that combines a chemiluminescent or bioluminescent system with an immune response for the detection of trace antigens or antibodies. Chemiluminescence immunoassay is currently the most mainstream immunoassay technology in the world. It has the advantages of high sensitivity, wide detection range, short reaction time, fully automatic operation, good reproducibility, no pollution, and the like. It is an ultra-high sensitive micro-detection technology developed after radioimmunoassay, enzyme immunoassay, and fluorescence immunoassay. The principle of chemiluminescence is the light generated when the ground-state molecule absorbs the energy released in the chemical reaction to transition to the excited state, and the excited-state molecule returns to the ground state in a form of optical radiation. Chemiluminescence immunoassay is a combination of chemiluminescence and immunoassay, which combines the high sensitivity of chemiluminescence and the high selectivity of immunoassay.

In chemiluminescence immunoassays, luminescent substances commonly used include luminol, isoluminol, 3-(2-spiroadamantane)-4-methoxy-4-(3-phosphoryloxy)-phenyl-1,2-dioxetane disodium salt (abbreviated as AMPPD), terpyridine ruthenium, or acridine luminescent substance. Isoluminol, terpyridine ruthenium, and acridine luminescent substances can be used as a tracer molecule for direct labeling, and belongs to flash-type chemiluminescent substance. Luminol and AMPPD rely on peroxidase and alkaline phosphatase as tracer molecules for labeling, respectively, and belong to enzymatic luminescent chemiluminescent substances. The luminescence reaction of the acridine luminescent substance does not require a catalyst, and can be carried out in an alkaline environment, and the luminescence reaction is rapid, the background luminescence is low, and the signal-to-noise ratio is high. In addition, the luminescence reaction has few interference factors, good reagent stability, simple chemiluminescence system and low cost of the excitation liquid, and the acridine luminescent substance is an ideal chemiluminescent substance.

The conventional acridine-type fully automatic chemiluminescence system mainly uses hydrogen peroxide in combination with an acidic solution and an alkaline solution as a luminescence starting reagent, and some of that adds enhancers such as polyethylene glycol octyl phenyl ether (Triton X-100) and Tween 20 (Tween 20) to the luminescence starting reagent to enhance luminescence. However, the effect of enhancing the luminescence after the addition of the conventional enhancer is not obvious. In summary, the conventional acridine luminescent substance has a weak luminescence intensity.

SUMMARY

Accordingly, it is necessary to provide a chemiluminescence enhancer and a chemiluminescence immunoassay kit which can enhance a luminescence intensity of an acridine luminescent substance.

A chemiluminescence enhancer for enhancing a luminescence intensity of an acridine luminescent substance is provided, which includes a betaine compound.

A chemiluminescence immunoassay kit includes the aforementioned chemiluminescence enhancer and the acridine luminescent substance.

The betaine compound is a compound having a quaternary ammonium inner salt structure or a so-called ammonium onium structure, and is commonly used as an osmotic pressure regulator, a detergent, a bactericide, and the like. The inventors have surprisingly found that the betaine compound has an effect of enhancing the luminescence intensity of the acridine luminescent substance, and can be used to prepare the chemiluminescence enhancer. The experiment results show that the betaine compound can significantly enhance the luminescence intensity of the acridine luminescent substance, and the enhancement multiple is higher than that of the conventional enhancers Triton X-100 and Tween 20.

DETAILED DESCRIPTION OF THE INVENTION

Figure 1:
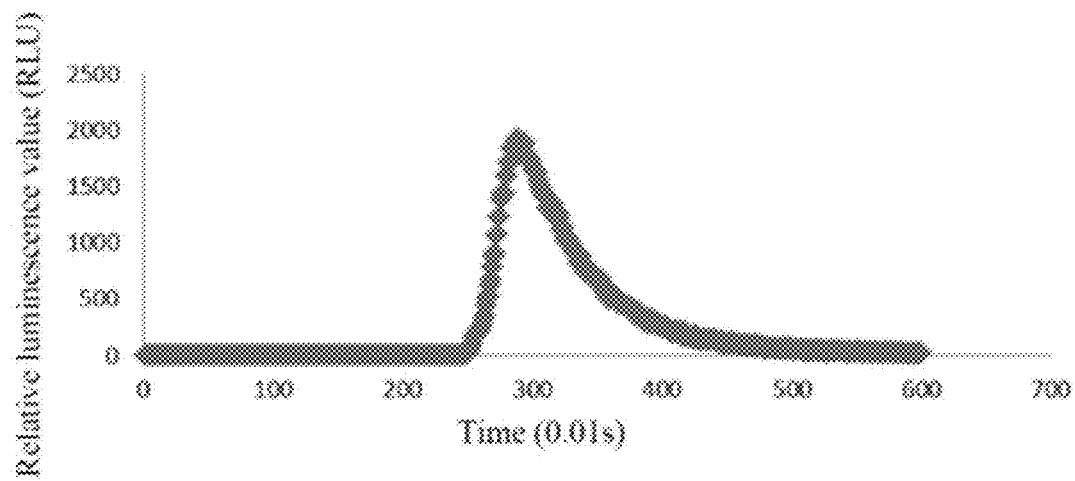
FIG. 1 is a graph showing a luminescence intensity of an acridinium ester after addition of a chemiluminescence enhancer containing tetradecyl amide propyl hydroxypropyl sulfobetaine by using an iFlash 3000 fully automatic chemiluminescence instrument.

The above objects, features and advantages of the present invention will become more apparent by describing in detail embodiments thereof with reference to the accompanying drawings. Numerous specific details are set forth in the description below in order to provide a thorough understanding of the invention. However, the present invention can be implemented in many other ways than those described herein, and those skilled in the art can make similar modifications without departing from the scope of the present invention, and thus the present invention is not limited by the specific embodiments disclosed below.

A chemiluminescence enhancer according to an embodiment is provided. The chemiluminescence enhancer includes a betaine compound and can be used to enhance a luminescence intensity of an acridine luminescent substance. Of course, the chemiluminescence enhancer may further include a solvent dissolving the betaine compound, or an acceptable impurity, or the like.

The betaine compound is a compound having a quaternary ammonium inner salt or a so-called ammonium onium. Acridine luminescent substances are a class of chemicals that can be used as chemiluminescence labels, such as acridinium esters or acridine salts.

Specifically, the betaine compound has a formula of:

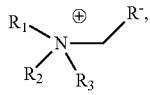

where $R^-$ is an anionic group. $R_1$ is a $C_5$ to $C_{20}$ alkylamide group, a $C_5$ to $C_{20}$ alkyl group, a $C_2$ to $C_{10}$ alkenyl group, or a $C_2$ to $C_{10}$ alkynyl group. $R_2$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group. $R_3$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group.

$R^-$ is an anionic group and is complexed with a quaternary ammonium internal salt to form the betaine compound.

In an embodiment, the betaine compound is compound I, having a formula of:

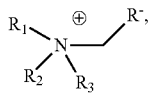

where $R_1$ is a $C_5$ to $C_{20}$ alkylamide group, a $C_5$ to $C_{20}$ alkyl group, a $C_2$ to $C_{10}$ alkenyl group, or a $C_2$ to $C_{10}$ alkynyl group. $R_2$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group. $R_3$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group. In other words, in the present embodiment, $—R^-$ is $—COO^-$.

In another embodiment, the betaine compound is compound II, and the compound II has a formula of:

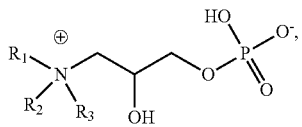

where $R_1$ is a $C_5$ to $C_{20}$ alkylamide group, a $C_5$ to $C_{20}$ alkyl group, a $C_2$ to $C_{10}$ alkenyl group, or a $C_2$ to $C_{10}$ alkynyl group. $R_2$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group. $R_3$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group. In other words, in the present embodiment, $—R^-$ is

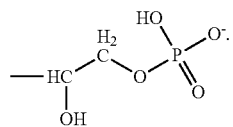

In another embodiment, the betaine compound is compound III, and the compound III has a formula of:

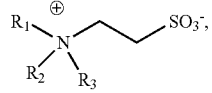

where $R_1$ is a $C_5$ to $C_{20}$ alkylamide group, a $C_5$ to $C_{20}$ alkyl group, a $C_2$ to $C_{10}$ alkenyl group, or a $C_2$ to $C_{10}$ alkynyl group. $R_2$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group. $R_3$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group. In other words, in the present embodiment, $—R^-$ is $—CH_2—SO_3^-$.

In yet another embodiment, the betaine compound is compound IV, and the compound IV has a formula of:

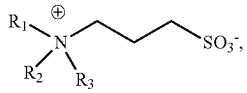

where $R_1$ is a $C_5$ to $C_{20}$ alkylamide group, a $C_5$ to $C_{20}$ alkyl group, a $C_2$ to $C_{10}$ alkenyl group, or a $C_2$ to $C_{10}$ alkynyl group. $R_2$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group. $R_3$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group. In other words, in the present embodiment, $—R^-$ is $—CH_2—CH_2—SO_3^-$.

In yet another embodiment, the betaine compound is compound V, and the compound V has a formula of:

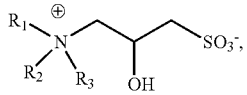

where $R_1$ is a $C_5$ to $C_{20}$ alkylamide group, a $C_5$ to $C_{20}$ alkyl group, a $C_2$ to $C_{10}$ alkenyl group, or a $C_2$ to $C_{10}$ alkynyl group. $R_2$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group. $R_3$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group. In other words, in the present embodiment, $—R^-$ is $—CH(OH)—CH_2—SO_3^-$.

Herein, specifically, the $C_5$ to $C_{20}$ alkyl group in each of the formulas can be a linear alkyl group or a branched alkyl group. The $C_2$ to $C_{10}$ alkenyl group can be a linear alkenyl group or a branched alkenyl group. The $C_2$ to $C_{10}$ alkynyl group can be a linear alkynyl group or a branched alkynyl group. The $C_1$ to $C_{10}$ alkyl group can be a linear alkyl group or a branched alkyl group. The $C_1$ to $C_{10}$ alkoxy group can be a linear alkyl group or a branched alkyl group.

In addition, $R_1$ is a $C_5$ to $C_{20}$ alkylamide group, a $C_{10}$ to $C_{20}$ alkyl group. $R_2$ is a $C_1$ to $C_5$ alkyl group, a $C_1$ to $C_5$ alkoxy group, a $C_2$ to $C_5$ alkenyl group, or a $C_2$ to $C_5$ alkynyl group. $R_3$ is a $C_1$ to $C_5$ alkyl group, a $C_1$ to $C_5$ alkoxy group, a $C_2$ to $C_5$ alkenyl group, or a $C_2$ to $C_5$ alkynyl group.

Specifically, the alkylamide group refers to a group in which an alkyl group is bonded to an amide group, and its formula can be, for example, $C_5H_{11}—CONH—$, $C_{11}H_{24}—CONH—$, $C_{13}H_{27}—CONH—$, $C_{20}H_{27}—CONH—$ or the like. Moreover, the amide group on the alkylamide group may also be bonded to a $C_1$ to $C_{10}$ alkyl group, and its formula may be, for example, $C_{13}H_{27}$—CONH—$(CH_2)_3$— or $C_{11}H_{24}$—CONH—$(CH_2)_{10}$— or the like.

Specifically, $R_1$ can be the $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, or $C_{20}$ alkyl group. $R_1$ can also be the $C_2$, $C_3$, $C_4$, $C_5$, $C_6$, $C_7$, $C_8$, $C_9$ or $C_{10}$ alkenyl group. Alternatively, $R_1$ can also be the $C_2$, $C_3$, $C_4$, $C_5$, $C_6$, $C_7$, $C_8$, $C_9$ or $C_{10}$ alkynyl group.

Specifically, $R_2$ can be the $C_1$, $C_2$, $C_3$, $C_4$, $C_5$, $C_6$, $C_7$, $C_8$, $C_9$ or $C_{10}$ alkyl group. $R_2$ can be the $C_1$, $C_2$, $C_3$, $C_4$, $C_5$, $C_6$, $C_7$, $C_8$, $C_9$ or Cm alkoxy group. $R_2$ can also be the $C_2$, $C_3$, $C_4$, $C_5$, $C_6$, $C_7$, $C_8$, $C_9$ or $C_{10}$ alkenyl group. Alternatively, $R_2$ can also be the $C_2$, $C_3$, $C_4$, $C_5$, $C_6$, $C_7$, $C_8$, $C_9$ or $C_{10}$ alkynyl group.

Specifically, $R_3$ can be the $C_1$, $C_2$, $C_3$, $C_4$, $C_5$, $C_6$, $C_7$, $C_8$, $C_9$ or $C_{10}$ alkyl group. $R_3$ can be the $C_1$, $C_2$, $C_3$, $C_4$, $C_5$, $C_6$, $C_7$, $C_8$, $C_9$ or $C_{10}$ alkoxy group. $R_3$ can also be the $C_2$, $C_3$, $C_4$, $C_5$, $C_6$, $C_7$, $C_8$, $C_9$ or $C_{10}$ alkenyl group. Alternatively, $R_3$ can also be the $C_2$, $C_3$, $C_4$, $C_5$, $C_6$, $C_7$, $C_8$, $C_9$ or $C_{10}$ alkynyl group.

Furthermore, $R_1$, $R_2$, and $R_3$ can be the same or different. When $R_1$, $R_2$, and $R_3$ are each independently selected from alkenyl or alkynyl group, the alkenyl or alkynyl group may be at any position in the corresponding group.

The inventors have surprisingly found that the betaine compound has an effect of enhancing the luminescence intensity of the acridine luminescent substance, and can be used to prepare the chemiluminescence enhancer. The betaine compounds have the properties of amphoteric surfactants, simple structure, single composition, easy to control inter-assay difference, and effectively reduce the effects of different chemiluminescence enhancement effects due to inter-assay differences. By using the chemiluminescence enhancer, the luminescence intensity of the acridine luminescent substance can be effectively enhanced, the luminescence signal is obviously enhanced, and the reproducibility is good, and can be widely used in clinical diagnosis, scientific research, environmental sanitation detection, and the like. In addition, the compound having the aforementioned general formula can enhance the luminescence intensity of the acridine luminescent substance by at least two times, and the enhancement multiple is higher than that of the conventional enhancers Triton X-100 and Tween 20.

A chemiluminescence immunoassay kit includes the aforementioned chemiluminescence enhancer and the acridine luminescent substance.

In general, the betaine compound can be dissolved in a solvent to prepare the chemiluminescence enhancer. The solvent can be water, an acidic solution, or an alkaline solution, or the like. In the present embodiment, the betaine compound is dissolved in water to prepare the chemiluminescence enhancer.

Specifically, the acridine luminescent substance may be an acridinium ester. For example, NSP-DMAE-NHS acridinium ester, NSP-DMAE-HEG-NHS acridinium ester, and the like.

A flow chart of a chemiluminescence reaction of the acridine luminescent substance according to an embodiment is as follows:

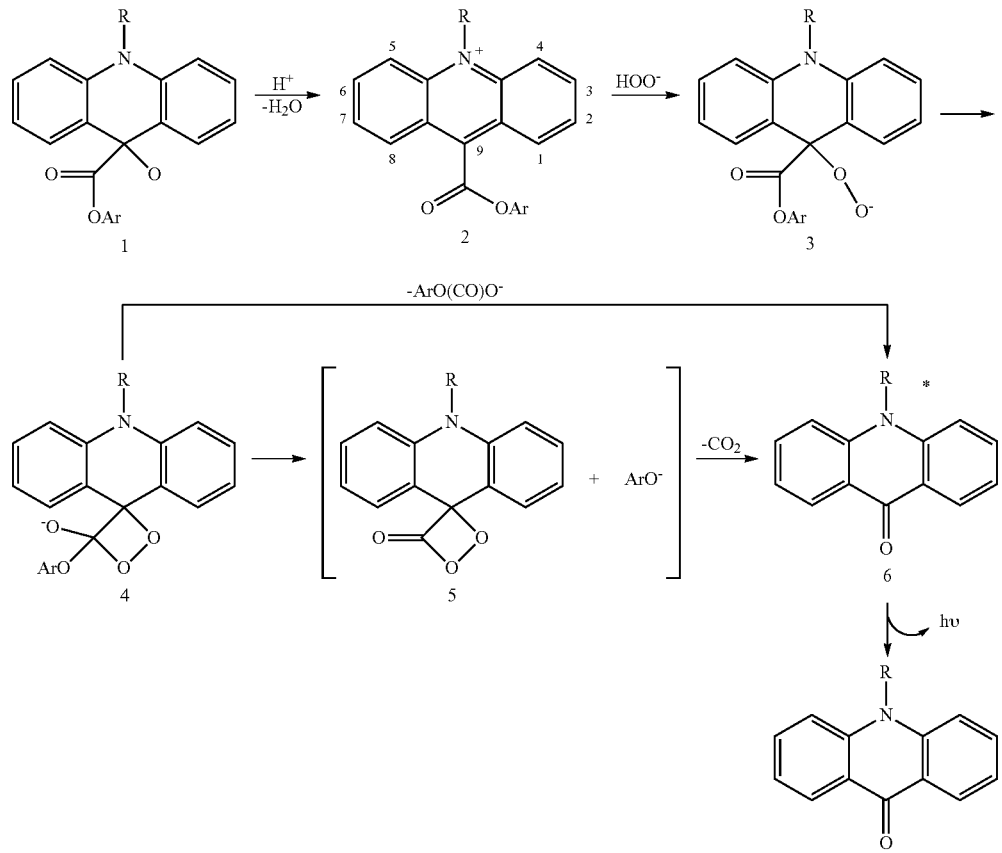

The structure represented by formula 1 represents an acridine compound, and R in formula 1 to formula 6 can be H, alkyl group, or alkyl-sulfo group, or the like, and Ar can be a group containing a phenyl group. The specific luminescence process is as follows: the acridine compound represented by formula 1 is subjected to an addition of hydrogen peroxide to the 9-position carbon atom of the acridine ring under an acidic condition to obtain a compound represented by formula 2. And then, hydrogen peroxide forms a peroxy anion under an alkaline condition, the compound represented by formula 2 is reacted to obtain a compound represented by formula 3. Thereafter, an unstable intermediate 1,2-dioxyheterocyclic butanone (compound represented by formula 6) is produced by intramolecular attack of the carbonyl group and leaving of the leaving group. Then, the 1,2-dioxyheterocyclic butanone is ring-opened to produce acridones while the photons are released.

In general, in the chemiluminescence immunoassay kit, the chemiluminescence enhancer and the acridine luminescent substance are separately placed and mixed at the time of use.

In the present embodiment, the chemiluminescence immunoassay kit further includes a chemiluminescence pre-trigger solution and trigger solution. The chemiluminescence pre-trigger solution includes $HNO_3$ and $H_2O_2$ solutions, and the trigger solution includes a NaOH solution.

Specifically, the $HNO_3$ solution has a concentration of 0.05 mol/L to 0.3 mol/L, and the $H_2O_2$ solution has a volume percentage of 0.1% to 1%. The NaOH solution has a concentration of 0.05 mol/L to 0.5 mol/L.

In the present embodiment, the $HNO_3$ solution has the concentration of 0.1 mol/L, and the $H_2O_2$ solution has the volume percentage of 0.5%. The NaOH solution has the concentration of 0.25 mol/L.

The chemiluminescence pre-trigger solution and basal trigger solution are used as the starting reagent for luminescence, which are cooperated with the chemiluminescence enhancer to further improve the luminescence intensity of the acridine luminescent substance.

Specifically, the chemiluminescence enhancer can be added to the basal trigger solution to prepare a chemical trigger solution, thereby improving the luminescence intensity of the acridine luminescent substance.

The aforementioned chemiluminescence immunoassay kit includes the chemiluminescence enhancer and the acridine luminescent substance. The betaine compound is used as chemiluminescence enhancers, which can effectively enhance the luminescence intensity of the acridine luminescent substance. The enhancement multiple is higher than that of the conventional enhancers Triton X-100 and Tween 20, and the reproducibility is good. In addition, the betaine compounds have the properties of amphoteric surfactants, simple structure, and single composition, which is easy to control inter-assay difference, can effectively reduce the effects of different chemiluminescence enhancement effects due to inter-assay differences, and improve the detection sensitivity of the chemiluminescence immunoassay kit. This kit can be widely used in the fields of clinical diagnosis, scientific research, environmental sanitation detection, and the like.

The following is the specific examples.

In the following examples, unless otherwise specified, the experimental methods without specifying the specific conditions are usually in accordance with conventional conditions. The used experimental materials of the betaine compound were purchased from Henan Titaning Chemical Technology Co., Ltd. Tween 20 (sigma, Cat. No. V900548) and Triton X-100 (sigma, Cat. No. V900502). Acridinium ester (NSP-DMAE-NHS) and acridine salt (NSP-SA-NHS) were purchased from Shanghai MaterWin New Materials Co., Ltd. The instrument for detecting chemiluminescence is the iFlash 3000 fully automatic chemiluminometer.

Example 1 to Example 13

Effect of Betaine Compounds on Luminescence Intensity of Acridine Luminescent Substances 1) Preparation of Pre-Trigger Solution A pre-trigger solution containing $HNO_3$ and $H_2O_2$ was prepared by using ultrapure water. $HNO_3$ had a final concentration of 0.1 mol/L in the pre-trigger solution, and $H_2O_2$ solution had a volume percentage of 0.5% in the pre-trigger solution.

2) Preparation of Basal Trigger Solution

A basal trigger solution containing NaOH was prepared by using ultrapure water. NaOH had a final concentration of 0.25 mol/L in the basal trigger solution.

3) Preparation of Chemical Trigger Solution

A chemiluminescence enhancer was separately added into the basal trigger solution. The chemiluminescence enhancer included betaine compounds Z1 to Z13, respectively, to obtain chemical trigger solutions. Each of the betaine compounds Z1 to Z13 in the chemiluminescence enhancer had an original concentration of 10 g/L, an addition amount of the chemiluminescence enhancer was 2 μL to 30 μL. In the present example, 10 μL of the chemiluminescence enhancer containing Z1 to Z13, respectively, was added to the basal trigger solution to obtain the chemical trigger solution. The formulas of the betaine compounds Z1 to Z13 included in the chemiluminescence enhancer were as follows:

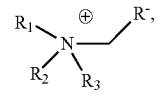

where $R^-$ is an anionic group, and specifically includes the following four types of Y1 to Y5. The specific structures of Y1 to Y5 are as follows:

| Name | Structure |
|---|---|
| Y1 | —COO⁻ |
| Y2 | —HC(CH₂)—O—P(OH)(=O)—O⁻ with OH |
| Y3 | —CH₂SO₃⁻ |
| Y4 | —CH₂CH₂SO₃⁻ |
| Y5 | —CHCH₂SO₃⁻ with OH |

$R_1$ is a $C_5$ to $C_{20}$ alkylamide group, a $C_5$ to $C_{20}$ alkyl group, a $C_2$ to $C_{10}$ alkenyl group, or a $C_2$ to $C_{10}$ alkynyl group. $R_2$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group. $R_3$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group. The specific structures corresponding to the betaine compounds Z1 to Z13 are shown in Table 1.

TABLE 1

Names and formulas of betaine compounds Z1 to Z13

| Enhancer | Name | $R_1$ | $R_2$ | $R_3$ | $R^-$ |
|---|---|---|---|---|---|
| Z1 | Dodecyl ethoxy sulfobetaine | —$C_{12}H_{25}$ | —$OC_2H_5$ | —$OC_2H_5$ | Y3 |
| Z2 | Dodecyl dimethyl hydroxypropyl sulfobetaine | —$C_{12}H_{25}$ | —$CH_3$ | —$CH_3$ | Y4 |
| Z3 | Dodecyl dimethyl sulfopropyl betaine | —$C_{12}H_{25}$ | —$CH_3$ | —$CH_3$ | Y4 |
| Z4 | Tetradecanamide propyl hydroxypropyl sulfobetaine | —$(CH_2)_3NHCOC_{13}H_{27}$ | —$CH_3$ | —$CH_3$ | Y5 |
| Z5 | Cetyl phosphate betaine | —$C_{16}H_{33}$ | —$CH_3$ | —$CH_3$ | Y2 |
| Z6 | Cocamide phosphate betaine | —$NHCOC_{11}H_{24}$ | —$CH_3$ | —$CH_3$ | Y2 |
| Z7 | Pentyl dimethyl betaine | —$C_5H_{11}$ | —$CH_3$ | —$CH_3$ | Y1 |
| Z8 | Decyl ethyl decyloxy betaine | —$C_{10}H_{21}$ | —$C_2H_5$ | —$OC_{10}H_{21}$ | Y1 |
| Z9 | Eicosyl divinyl phosphate betaine | —$C_{20}H_{25}$ | —$C_2H_3$ | —$C_2H_3$ | Y2 |
| Z10 | Vinyl decyl sulfobetaine | —$C_2H_3$ | —$C_{10}H_{21}$ | —$C_{10}H_{21}$ | Y3 |
| Z11 | 2, decenyl diethynyl propyl sulfobetaine | —$C_{10}H_{20}$ | —C≡CH | —C≡CH | Y4 |
| Z12 | Ethynyl diethoxy phosphate betaine | —C≡CH | —$OC_2H_5$ | —$OC_2H_5$ | Y2 |
| Z13 | 3, decynyl dimethyl betaine | —$C_{10}H_{18}$ | —$CH_3$ | —$CH_3$ | Y1 |

4) Determination of Chemiluminescence Signals

10 µL of acridine solution at a concentration of 1 pg/mL was used as a sample. The acridine solution in the present example was NSP-DMAE-HEG-NHS acridinium ester, and its formula was as follows:

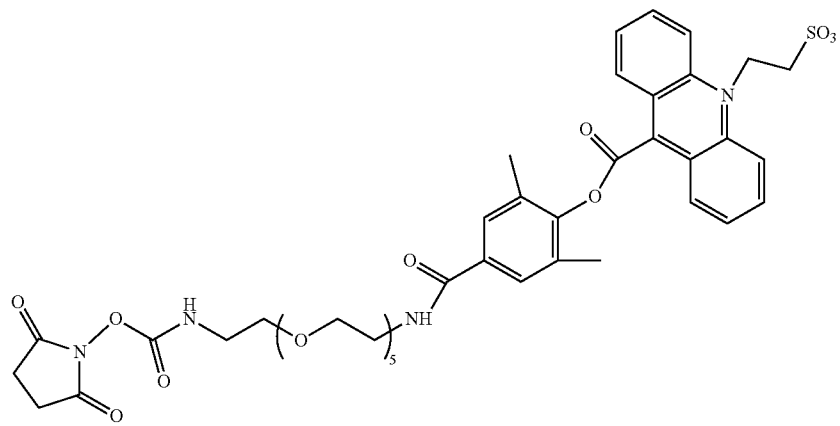

100 µL of the pre-trigger solution was added into the sample, and 100 µL of each of the chemical trigger solutions was separately added. The chemical trigger solution contained the basal trigger solution and the betaine compounds Z1 to Z13, respectively. The chemiluminescence signals were measured on a chemiluminescence detector, and an enhancement multiple between a signal value of each luminescence solution and a signal value of the basal lumines-cence solution was calculated. A luminescence curve corresponding to Example 5 was shown in FIG. 1. The results of luminescence intensities of Example 1 to Example 13 were shown in Table 2.

TABLE 2

Luminescence intensities of Control group and Example 1 to Example 13

| Experimental content | Chemiluminescence enhancer component | Luminescence intensity (RLU) | Enhancement multiple |
|---|---|---|---|
| Control group | None | 12362 | 1.00 |
| Example 1 | Z1 | 63743 | 5.16 |

TABLE 2-continued

Luminescence intensities of Control group and Example 1 to Example 13

| Experimental content | Chemiluminescence enhancer component | Luminescence intensity (RLU) | Enhancement multiple |
|---|---|---|---|
| Example 2 | Z2 | 52493 | 4.25 |
| Example 3 | Z3 | 74625 | 6.04 |
| Example 4 | Z4 | 69574 | 5.63 |
| Example 5 | Z5 | 156837 | 12.69 |
| Example 6 | Z6 | 127426 | 10.31 |
| Example 7 | Z7 | 56783 | 4.59 |
| Example 8 | Z8 | 52599 | 4.25 |
| Example 9 | Z9 | 45432 | 3.68 |
| Example 10 | Z10 | 40169 | 3.25 |
| Example 11 | Z11 | 63398 | 5.13 |
| Example 12 | Z12 | 55928 | 4.52 |
| Example 13 | Z13 | 44502 | 3.60 |

The control group was the same as Example 1 to Example 13 except that no chemiluminescence enhancer was added. As can be seen from Table 2, the addition of the chemiluminescence enhancer containing betaine compounds Z1 to Z13 can effectively enhance the luminescence intensity of acridinium ester. The enhancement multiple is more than 4 times.

Comparative Example 1 to Comparative Example 2

In order to further verify the effect of betaine compounds on the luminescence intensities of acridinium esters, Tween 20 and Triton X-100 were used as comparative examples. The steps of preparing the pre-trigger solution and preparing the basal trigger solution in the comparative examples were the same as in Examples 1 to 13. The difference was that when the chemical trigger solution was prepared, 10 μL of Tween 20 and Triton X-100 having original concentrations of 10 g/L were added to the basal trigger solution to obtain the chemical trigger solution of the comparative examples, respectively. The chemiluminescence signals of the comparative examples were measured by using the chemiluminescence detector, and an enhancement multiple between a signal value of each luminescence solution and a signal value of the basal luminescence solution was calculated, and the results were shown in Table 3.

TABLE 3

Luminescence intensities of Control group and Comparative Examples 1 and 2

| Experimental content | Chemiluminescence enhancer component | Luminescence intensity (RLU) | Enhancement multiple |
|---|---|---|---|
| Control group | None | 12362 | 1.00 |
| Comparative Example 1 | Tween 20 | 36379 | 2.94 |
| Comparative Example 2 | Triton X-100 | 48681 | 3.94 |

Comparing the results of Tables 2 and 3, it can be seen that the use of the betaine compounds can enhance the chemiluminescence of the acridine compounds, and the enhancement effect is better than that of Tween 20 and Triton X-100. In addition, the chemiluminescence signals of the chemiluminescence in Examples 1 to 13 were also stable, and the luminescence efficiency was high.

Example 14

Figure 2:
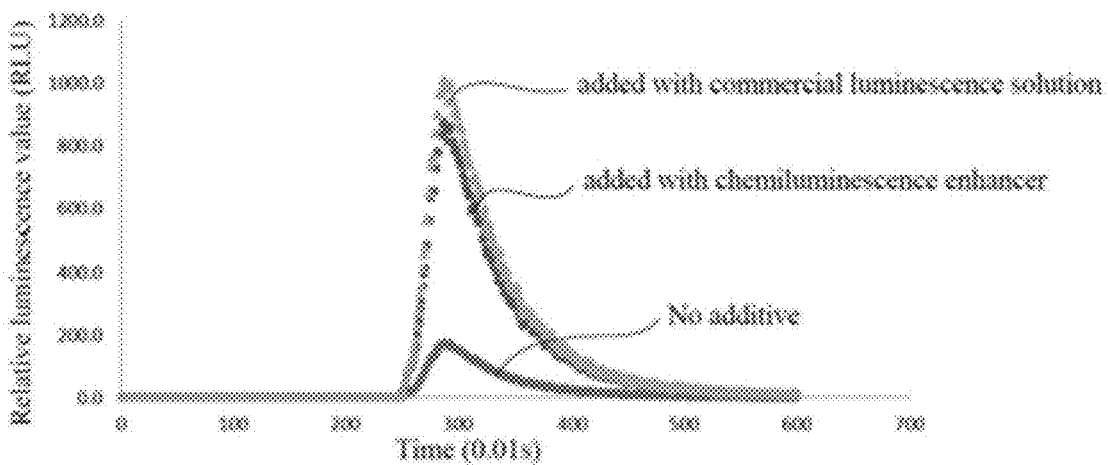
FIG. 2 is a graph showing a luminescence intensity of an acridine salt in the absence of an enhancer and an addition of a chemiluminescence enhancer and an Architect Trigger Solution (Abbott) commercial luminescence solution, respectively, by using an iFlash 3000 fully automatic chemiluminescence instrument.

In order to further compare the chemiluminescence enhancement effect of the betaine compounds on the acridine compounds, Architect Trigger Solution (Abbott, Cat. No. 6C55-60) commercial luminescence solution was used as a control. The sample solution of the present example was 10 μL of a solution of acridine salt (NSP-SA-NHS) at a concentration of 1 pg/mL. The pre-trigger solution and the basal trigger solution were the same as in Examples 1 to 13. 10 μL of a Z5-containing chemiluminescence enhancer was added to the basal trigger solution to obtain a chemical trigger solution. 100 μL of the pre-trigger solution was added to the sample, and then 100 μL of the chemical trigger solution containing the enhancer Z5 or 100 μL of the Architect Trigger Solution (Abbott) commercial luminescence solution was added, respectively. The luminescence intensity of the acridine salt in the absence of an enhancer, the Z5-containing chemiluminescence enhancer, and the Architect Trigger Solution (Abbott) commercial luminescence solution were measured, respectively. The results were shown in FIG. 2, compared to the luminescence signal of the commercial luminescence solution Architect Trigger Solution (Abbott). Under the action of the enhancer of the present disclosure, the luminescence signal of acridine was greatly enhanced, and the performance of the enhancement luminescence solution was close to that of Architect Trigger Solution (Abbott).

As can be seen from the results of Examples 1 to 14 and Comparative example 1, the betaine compound has a good effect on enhancing chemiluminescence of the acridine compound, and can improve the detection sensitivity of diagnostic kits.

All data, images, instruments, reagents and steps herein are to be understood as illustrative and not limiting.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the appended claims.

The invention claimed is:

1. A chemiluminescence enhancer comprises a betaine compound, wherein the betaine compound has a formula of:

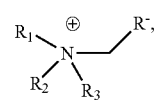

(1) wherein $R^-$ is an anionic group comprising —O—P(=O)(OH)($O^-$); $R_1$ is a $C_5$ to $C_{20}$ alkylamide group, a $C_5$ to $C_{20}$ alkyl group, a $C_2$ to $C_{10}$ alkenyl group, or a $C_2$ to $C_{10}$ alkynyl group; $R_2$ is a $C_1$ to $C_{10}$ alkoxy group, a $C_2$ to $C_{10}$ alkenyl group, or a $C_2$ to $C_{10}$ alkynyl group; and $R_3$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group; or (2) wherein $R^-$ is an anionic group; $R_1$ is a $C_5$ to $C_{20}$ alkylamide group, a $C_5$ to $C_{20}$ alkyl group, a $C_2$ to $C_{10}$ alkenyl group, or a $C_2$ to $C_{10}$ alkynyl group; $R_2$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group; and $R_3$ is a $C_1$ to $C_{10}$ alkoxy group, a $C_2$ to $C_{10}$ alkenyl group, or a $C_2$ to $C_{10}$ alkynyl group.

2. The chemiluminescence enhancer according to claim 1, wherein the betaine compound has a formula of:

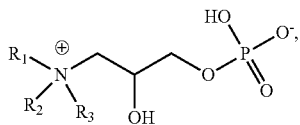

(1) wherein $R_1$ is a $C_5$ to $C_{20}$ alkylamide group, a $C_5$ to $C_{20}$ alkyl group, a $C_2$ to $C_{10}$ alkenyl group, or a $C_2$ to $C_{10}$ alkynyl group; $R_2$ is a $C_1$ to $C_{10}$ alkoxy group, a $C_2$ to $C_{10}$ alkenyl group, or a $C_2$ to $C_{10}$ alkynyl group; and $R_3$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group; or (2) wherein $R_1$ is a $C_5$ to $C_{20}$ alkylamide group, a $C_5$ to $C_{20}$ alkyl group, a $C_2$ to $C_{10}$ alkenyl group, or a $C_2$ to $C_{10}$ alkynyl group; $R_2$ is a $C_1$ to $C_{10}$ alkyl group, a $C_1$ to $C_{10}$ alkoxy group, a $C_2$ to $C_{10}$ alkenyl group, or a $C_2$ to $C_{10}$ alkynyl group; and $R_3$ is a $C_1$ to $C_{10}$ alkoxy group, a $C_2$ to $C_{10}$ alkenyl group, or a $C_2$ to $C_{10}$ alkynyl group.

3. A chemiluminescence immunoassay kit comprising a chemiluminescence enhancer of claim 1 and an acridine luminescent substance.

4. The chemiluminescence immunoassay kit according to claim 3, wherein the acridine luminescent substance is an acridinium ester or an acridine salt.

5. The chemiluminescence immunoassay kit according to claim 3, further comprising a chemiluminescence pre-trigger solution and trigger solution, wherein the chemiluminescence pre-trigger solution comprises $HNO_3$ and $H_2O_2$ solutions, and the trigger solution comprises a NaOH solution.

* * * * *